US012811713B2

(12) United States Patent
Lee et al.

(10) Patent No.: US 12,811,713 B2
(45) Date of Patent: Nov. 24, 2026

(54) BASE STATION FOR PERFORMING LINK ADAPTATION AND METHOD OF OPERATING THE SAME IN COORDINATED MULTI-POINT SYSTEM

(71) Applicant: SAMSUNG ELECTRONICS CO., LTD., Suwon-si (KR)

(72) Inventors: Deokhui Lee, Suwon-si (KR); Myounghwan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 831 days.

(21) Appl. No.: 17/978,504

(22) Filed: Nov. 1, 2022

(65) Prior Publication Data

US 2023/0134649 A1 May 4, 2023

(30) Foreign Application Priority Data

Nov. 1, 2021 (KR) ........................ 10-2021-0148270
Mar. 14, 2022 (KR) ........................ 10-2022-0031622

(51) Int. Cl.
*H04L 1/00* (2006.01)
*H04L 1/1812* (2023.01)
*H04W 24/10* (2009.01)

(52) U.S. Cl.
CPC .......... *H04L 1/0003* (2013.01); *H04L 1/1812* (2013.01); *H04W 24/10* (2013.01)

(58) Field of Classification Search
CPC ..... H04L 1/0003; H04L 1/1812; H04W 24/10
See application file for complete search history.

(56) References Cited

U.S. PATENT DOCUMENTS

2006/0264180 A1 11/2006 Qiu
2010/0317355 A1 12/2010 Zangi et al.
(Continued)

FOREIGN PATENT DOCUMENTS

CN 111385040 A 7/2020
EP 2936906 A1 10/2015
(Continued)

OTHER PUBLICATIONS

PCT International Search Report dated Feb. 8, 2023 for PCT/KR2022/016887.
(Continued)

*Primary Examiner* — Tonia L Dollinger
(74) *Attorney, Agent, or Firm* — NIXON & VANDERHYE P.C.

(57) ABSTRACT

A method of operating a first base station (BS) comprises receiving a message including at least one piece of information associated with whether a coordinated multi-point (CoMP) operation is performed for a UE connected to the first BS. When the received message includes information indicating start of the CoMP operation, (1) the CoMP operation is performed at a timing indicated based on at least part of the at least one piece of information included in the received message, (2) a modulation and coding scheme (MCS) level is increased during a first period, and (3) performance of the CoMP operation is maintained during a second period after the MCS level reaches a specified first level based on the increase during the first period. When the received message includes information indicating termination of the CoMP operation, the CoMP operation is terminated and the MCS level is decreased.

20 Claims, 15 Drawing Sheets

(56) References Cited

U.S. PATENT DOCUMENTS

2013/0021929 A1* 1/2013 Kim ....................... H04B 7/024 370/332
2013/0058307 A1* 3/2013 Kim .................. H04L 25/03955 370/328
2013/0114658 A1 5/2013 Davydov et al.
2013/0308479 A1 11/2013 Schober et al.
2014/0293899 A1 10/2014 Ko et al.
2015/0029952 A1* 1/2015 Huang .................. H04L 1/1812 370/329
2015/0099527 A1* 4/2015 Zhuang .................. H04B 7/024 455/452.1
2015/0139009 A1 5/2015 Park et al.
2015/0358982 A1 12/2015 Jeon et al.
2016/0100383 A1 4/2016 Simonsson et al.
2017/0230137 A1 8/2017 Tang et al.
2017/0237535 A1* 8/2017 Park ....................... H04B 7/024 370/329
2017/0289984 A1 10/2017 Baligh et al.
2018/0020470 A1 1/2018 Zhuang et al.
2018/0175991 A1 6/2018 Son et al.
2019/0097750 A1 3/2019 Sandberg et al.
2019/0116599 A1 4/2019 Xue et al.
2021/0377912 A1* 12/2021 El Hamss ............. H04L 1/1854

FOREIGN PATENT DOCUMENTS

KR 10-2012-0033331 4/2012
KR 10-2014-0072185 6/2014
KR 10-2014-0090351 A 7/2014
WO WO 2014-094282 A1 6/2014

OTHER PUBLICATIONS

PCT Written Opinion dated Feb. 8, 2023 for PCT/KR2022/016887.
PCT Written Opinion dated Feb. 3, 2023 for PCT/KR2022/016999.
Extended European Search Report dated Nov. 25, 2024 for EP Application No. 22887756.9.
Cui Qimei et al.; "Capacity Analysis of Joint Transmission CoMP With Adaptive Modulation"; XP 011640665 A dated Feb. 17, 2021; vol. 66 No. 2; IEEE Transactions on Vehicular Technology; IEEE; USA.
Indian First Examination Report dated Jul. 3, 2026 in Indian corresponding patent application 202417039234.

* cited by examiner

BASE STATION FOR PERFORMING LINK ADAPTATION AND METHOD OF OPERATING THE SAME IN COORDINATED MULTI-POINT SYSTEM

CROSS REFERENCE TO RELATED APPLICATION

This application is a continuation of International Application No. PCT/KR2022/016887 designating the United States, filed on Nov. 1, 2022, in the Korean Intellectual Property Receiving Office and claiming priority to Korean Patent Application No. 10-2021-0148270, filed on Nov. 1, 2021, and Korean Patent Application No. 10-2022-0031622, filed on Mar. 14, 2022, the disclosures of which are all hereby incorporated herein by reference for all purposes as if fully set forth herein.

FIELD

Various example embodiments relate to a base station (BS) for performing link adaptation and/or a method of operating the same in a coordinated multi-point (CoMP) system.

BACKGROUND

Along with the development to long term evolution (LTE), 5th generation (5G), and 6$^{th}$ generation (6G), interference and noise increasingly affect channels. Link adaptation is a technology of overcoming channel problems adaptively according to a radio link state. Because the propagation condition between a base station (BS) and a roaming or cell-edge wireless terminal continuously changes over time, link adaptation is required to transmit data without errors by applying appropriate parameters according to the state of a radio link.

A link adaptation algorithm provides a data rate suitable for a channel environment by dynamically adjusting a modulation and coding scheme (MCS) level and/or rate-related parameters according to a radio channel environment. Parameters are defined for a link adaptation operation. In 4$^{th}$ generation (4G) LTE/5G new radio (NR), a link adaptation algorithm based on hybrid automatic repeat request (HARQ) acknowledgment (ACK)/negative ACK (NACK) feedback and a link adaptation algorithm based on channel state information (CSI) feedback are generally applied. These algorithm methods may be used continuously in an HARQ-based communication system.

In link adaptation, a network transceiver may select a set of modulation schemes and coding schemes defined based on an instantaneous estimate of the quality of a downlink channel to each wireless terminal (e.g. user equipment (UE)). Channel information is typically reported by a UE and may include a signal-to-interference and noise ratio (SINR) measured or estimated by the UE.

Since LTE Release 8/9, active research has been conducted on a broadband wireless communication system. In the broadband wireless communication system, before data is transmitted, a modulation scheme for transmission data and a coding rate of an error correction code are determined to be suitable for a channel environment. An MCS level for downlink (DL) or uplink (UL) transmission may be implemented in various manners according to methods in the broadband wireless communication system, typically in the following manner.

In the case of DL, upon receipt of CSI and a response signal for DL data, that is, an ACK/NACK signal from a UE, a BS determines the channel state of the UE based on the CSI and the ACK/NACK signal. The BS detects an MCS level corresponding to the determined channel state, referring to an MCS decision table including MCS level information for each predetermined channel state. The BS then transmits DL data to the UE, using the detected MCS level.

In the case of UL, the BS typically receives UL channel state (sounding reference signal (SRS)) information from the UE and measures an SRS-based SINR from an average interference over thermal (IoT) of a physical uplink shared channel (PUSCH) for each cell. Then, the BS receives a response signal to DL data, that is, an ACK/NACK signal, and determines the channel state of the UE based on the CSI (SRS-based SINR) and the ACK/NACK signal. In addition, the BS detects an MCS level corresponding to the determined channel state, referring to the MCS decision table including MCS level information for each predetermined channel state. Then, the BS may transmit DL data to the UE, using the detected MCS level.

In the coordinated multi-point (CoMP) standard, CoMP transmission/reception or multi-cell multiple input multiple output (MIMO) has been introduced, in which adjacent or proximate cells cooperate in consideration of the instantaneous channel and traffic condition of a UE at a cell edge. CoMP types include joint transmission (JT), coordinated scheduling (CS), coordinated beamforming (CB), beam nulling, minimum mean square error (MMSE), and dynamic point selection (DPS) for DL CoMP, and joint reception (JR), CS, and CB for UL CoMP. According to the DL CS/CB CoMP, when multiple BSs communicate with UEs through antenna beamforming, each UE may select antenna beamforming of each BS to increase the capacity of a cell-edge UE. Each UE selects the antenna beamforming of each BS so that a signal from the serving BS is maximized or increased, and interference signals from adjacent or proximate BSs are minimized or reduced. CS/CB CoMP cooperative BSs transmit data only to their UEs, not to UEs of adjacent cooperative cells. The CoMP technology may have problems in that the amount of information that needs to be transmitted to a backhaul for BS cooperation is large, and scheduling for resource allocation and CoMP signal processing calculations are complex. However, CoMP attracts attention as a cell cooperative scheduling technology with reduced implementation complexity, in view of its benefit of an increased cell-edge and cell average capacity, compared to inter-cell interference coordination (ICIC) technology.

A base station (BS) determines a modulation and coding scheme (MCS) level only based on interference information measured on a cell basis, uplink (UL) pilot strength information received from a user equipment (UE), and acknowledgment (ACK) information with no regard to the channel environment of the UE. The BS increases or decreases the MCS level in relation to the number of hybrid automatic repeat request (HARQ) feedback receptions, regardless of whether a coordinated multi-point (CoMP) operation is performed within a CoMP measurement group. However, when the increase speed (or increase rate) of the MCS level is relatively low, a relatively low MCS level is likely to be used even while a CoMP function is being performed. When the MCS level is low for data transmission, the data rate may be low in spite of a high signal-to-interference and noise ratio (SINR) of a radio channel between the UE and the BS. Moreover, when the SINR of the radio channel is low, the data rate may be low even though the MCS level is increased in data transmission, and the data transmission may fail.

Accordingly, as the MCS level does not increase at a relatively high speed (or rate) in spite of execution of a CoMP function, the data rate is likely to increase at a relatively low speed (or rate).

SUMMARY

A BS and a method of operating the same according to various example embodiments may increase an MCS level at a relatively high speed (or rate) based on identification of a time when a CoMP function is performed. Accordingly, an appropriate MCS level suitable for an SINR situation of a radio channel may be used, and a data rate may also be increased.

Certain example embodiments may rapidly increase or decrease a modulation and coding scheme (MCS) level in consideration of performing of a coordinated multipoint (CoMP) operation together with a link adaptation algorithm for a cell-edge user equipment (UE) to which a CoMP technology is applied.

According to various example embodiments, a method of operating a first BS for performing wireless communication with a UE may include receiving a message including at least one piece of information associated with whether a CoMP operation is performed for a UE connected to the first BS from a second BS connected to the first BS, when the received message includes information indicating start of the CoMP operation, performing the CoMP operation at a timing indicated based on at least part of the at least one piece of information included in the received message, increasing an MCS level during a first period, and maintaining the CoMP operation performed during a second period after the MCS level reaches a specified first level based on the increase during the first period, and when the received message includes information indicating termination of the CoMP operation, terminating the CoMP operation at a timing indicated based on at least part of the at least one piece of information included in the received message, and decreasing the MCS level during a third period.

According to various example embodiments, a first BS for performing wireless communication with a UE includes a transceiver and at least one processor comprising processing circuitry. The at least one processor may be configured to receive a message including at least one piece of information associated with whether a CoMP operation is performed for a UE connected to the first BS from a second BS connected to the first BS through the transceiver, when the received message includes information indicating start of the CoMP operation, perform the CoMP operation at a timing indicated based on at least part of the at least one piece of information included in the received message, increase an MCS level during a first period, and maintain the CoMP operation performed during a second period after the MCS level reaches a specified first level based on the increase during the first period, and when the received message includes information indicating termination of the CoMP operation, terminate the CoMP operation at a timing indicated based on at least part of the at least one piece of information included in the received message, and decrease the MCS level during a third period.

According to various example embodiments, a method and/or apparatus for rapidly increasing/decreasing a modulation and coding scheme (MCS) level adaptively according to a real-time channel state may be provided in a base station (BS) for performing a coordinated multi-point (CoMP) operation in a wireless communication system. As the MCS level is rapidly increased and then maintained to converge to a certain level during a period in which the CoMP operation is maintained, the CoMP operation may be optimally applied, thereby maximizing or increasing a diversity gain. Further, a cyclic redundancy check (CRC) failure probability may be decreased by rapidly decreasing the MCS level, and throughput loss caused by hybrid automatic repeat request (HARQ) retransmission may be minimized or reduced.

According to various example embodiments, an optimal MCS level may be reached in a short time in consideration of a signal-to-noise and interference ratio (SINR) increment according to whether a CoMP operation is performed.

BRIEF DESCRIPTION OF THE DRAWINGS

The above and other aspects, features, and advantages of certain example embodiments of the present disclosure will be more apparent from the following detailed description, taken in conjunction with the accompanying drawings, in which.

DETAILED DESCRIPTION

Figure 1A:
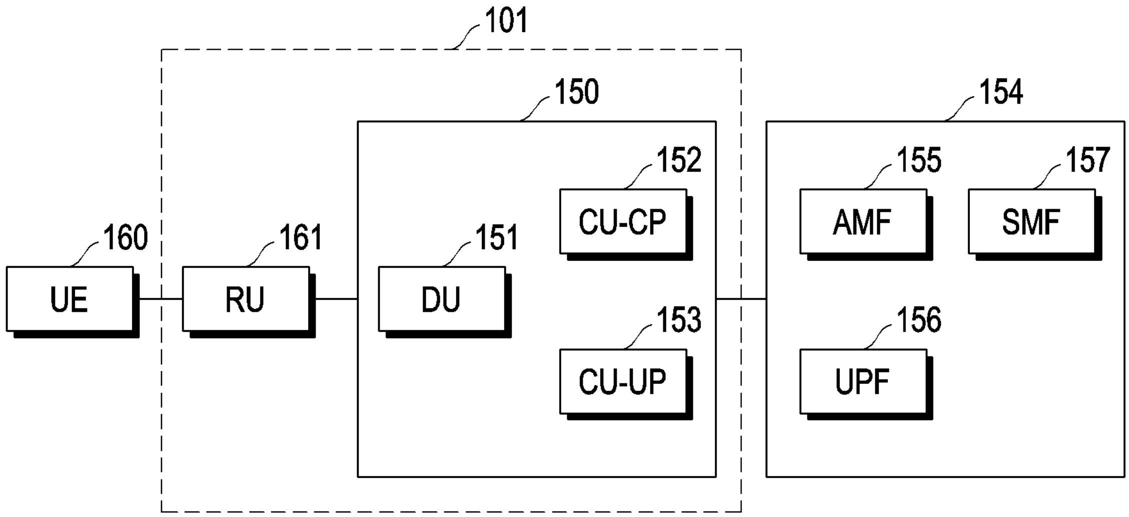
FIG. 1A is a block diagram illustrating a radio access network (RAN) and a core network (CN) according to various example embodiments.

Beyond voice-centered services in the initial development stage, wireless communication systems have been evolving to broadband wireless communication systems providing a high-speed and high-quality packet data service. A long term evolution (LTE) system as a representative example of the broadband wireless communication systems adopts orthogonal frequency division multiplexing (OFDM) for downlink (DL), and single carrier frequency division multiple access (SC-FDMA) for uplink (UL). UL refers to a radio link on which a user equipment (UE) or mobile station (MS) transmits data or a control signal to an evolved Node B (eNode B) or base station (BS). DL refers to a radio link on which a BS transmits data or a control signal to a UE. In the multiple access scheme as described above, time-frequency resources to carry data or control information for each user are allocated and operated without overlap with each other, that is, with orthogonality, to distinguish the data or control information.

A $5^{th}$ generation (5G) communication system, which is a next-generation communication system after LTE and currently provides communication services, may support services satisfying various requirements for users and service providers. Services considered for the 5G communication system include enhanced mobile broadband (eMBB), massive machine type communication (mMTC), ultra-reliability low latency communication (URLLC), and so on.

eMBB aims to provide a data rate higher than supported by legacy LTE, LTE-advanced (LTE-A), or LTE-Pro. For example, eMBB should be able to provide a peak data rate of 20 Gbps on DL and a peak data rate of 10 Gbps on UL from the perspective of one BS in the 5G communication system. In addition, the 5G communication system should provide an increased user perceived data rate to a UE, while providing the peak data rates. To satisfy these requirements, various improved transmission and reception technologies including advanced multiple input multiple output (MIMO) are required. A signal is transmitted in a transmission bandwidth of up to 20 MHz in the 2 GHz band used in LTE, whereas a frequency bandwidth wider than 20 MHz is used in the frequency band of 3 to 6 GHz, or 6 GHz or higher to satisfy the required data rates in the 5G communication system.

Further, mMTC is considered to support application services such as Internet of things (IoT) in the 5G communication system. In order to efficiently provide IoT, mMTC requires large-scale UE access support within a cell, improved UE coverage, increased battery life, and reduced UE cost. Since IoT provides communication functions through attachment to various sensors and devices, IoT should be able to support a large number of UEs (e.g., 1,000,000 UEs/$km^2$) within a cell. Because a UE supporting mMTC is highly likely to be located in a shadowing area not covered by a cell, such as the basement of a building, in view of the nature of the service, it may require wide coverage, compared to other services provided by the 5G communication system. An mMTC UE should be cheap and needs a very long battery life time such as 10 to 15 years due to the difficulty of frequent battery replacement.

Finally, URLLC is a cellular-based wireless communication service used for a specific (mission-critical) purpose. For example, services used for remote control of a robot or machine, industrial automation, an unmanned aerial vehicle, remote healthcare, emergency alert, and so on may be considered. Therefore, URLLC communication should provide very low latency and very high reliability. For example, a service supporting URLLC should satisfy an air interface latency of less than 0.5 milliseconds, and requires a packet error rate of $10^{-5}$ or less. Accordingly, the 5G system should provide a smaller transmission time interval (TTI) for a service supporting URLLC than for other services, and may require a design of allocating wide resources in a frequency band to secure the reliability of a communication link.

The three services of 5G, namely eMBB, URLLC, and mMTC may be multiplexed and transmitted in one system. In this case, to satisfy different requirements of each service, different transmission/reception techniques and transmission/reception parameters may be used between services. 5G is not limited to the three services.

For convenience of description, some terms and names defined in the $3^{rd}$ generation partnership project (3GPP) standards (the standards of 5G, new radio (NR), LTE, or similar systems) may be used. However, the disclosure is not limited by the terms and the names, and may be equally applied to systems conforming to other standards. Further, terms identifying access nodes, terms referring to network entities, terms referring to messages, terms referring to interfaces between network entities, and terms referring to various types of identification information, and so on, as used in the following description, are given by way of example, for convenience of description. Therefore, the terms as used in the disclosure do not limit the disclosure, and may be replaced with other terms referring to objects having equivalent technical meanings.

In describing embodiments, a description of technical content which is well known in the technical field of the disclosure and not directly related to the disclosure will be avoided, lest it should obscure the subject matter of the disclosure.

For the same reason, some components are exaggerated, omitted, or schematically illustrated in the accompanying drawings. In addition, the size of each component does not fully reflect the actual size. In each drawing, like reference numerals denote the same or corresponding components.

The advantages and features of the disclosure, and a method of achieving them will become apparent from reference to embodiments described below in detail in conjunction with the attached drawings. However, the disclosure may be implemented in various manners, not limited to the embodiments set forth herein. Rather, these embodiments are provided such that the disclosure is complete and thorough and its scope is fully conveyed to those skilled in the art, and the disclosure is only defined by the appended claims. The same reference numerals denote the same components throughout the specification. A detailed description of a generally known function or structure will be avoided lest it should obscure the subject matter of the disclosure. Although the terms used in the disclosure are defined in consideration of functions in the disclosure, the terms may be changed according to the intention of a user or an operator, or customs. Therefore, the definitions should be made, not simply by the actual terms used but by the meanings of each term lying within.

A BS, which is an entity responsible for resource allocation to a UE, may be at least one of a gNode B, a gNB, an eNode B, an eNB, a Node B, various radio access units including a satellite, a base station controller (BSC), or a network node. Further, the BS may be a network entity including at least one of an integrated access and backhaul-donor (IAB-donor) which is a gNB providing network access to UE(s) through a network of backhaul and access links or an IAB-node which is a radio access network (RAN) node supporting new radio (NR) access link(s) to UE(s) and NR backhaul links to the IAB-donor or other IAB-nodes in the 5G (NR) system. A UE may be wirelessly connected through an IAB-node and transmit and receive data to and from an IAB-donor connected to at least one IAB-node via a backhaul link.

The UE may include an MS, a cellular phone, a smartphone, a computer, or a multimedia system capable of performing a communication function. DL refers to a radio link on which a BS transmits a signal to a UE, and UL refers to a radio link on which a UE transmits a signal to a BS. While the following description may be given in the context of an LTE or LTE-A system, by way of example, embodiments may be applied to other communication systems having similar technical backgrounds or channel types. For example, the communication systems may include the 5G mobile communication technology developed after LTE-A, and 5G may conceptually cover legacy LTE, LTE-A, and other similar services in the following description. Further, the disclosure is also applicable to other communication systems without departing much from the scope of the disclosure, as judged by those skilled in the art.

It will be understood that each block of the flowchart illustrations and combinations of blocks in the flowchart illustrations may be implemented by computer program instructions. These computer program instructions may be loaded on a processor of a general purpose computer, special purpose computer, or other programmable data processing equipment, such that the instructions, which are executed via the processor of the computer or other programmable data processing equipment, create means for implementing the functions specified in the flowchart and/or block diagram block(s). These computer program instructions may also be stored in a computer-usable or computer-readable memory that may direct the computer or other programmable data processing equipment to function in a particular manner, such that the instructions stored in the computer-usable or computer-readable memory produce an article of manufacture including instruction means which implement the function specified in the flowchart and/or block diagram block(s). The computer program instructions may also be loaded onto the computer or other programmable data processing equipment to cause a series of operations to be performed on the computer or other programmable data processing equipment to produce a computer implemented process such that the instructions which are executed on the computer or other programmable equipment provide operations for implementing the functions/acts specified in the flowchart and/or block diagram block(s).

Furthermore, the respective block diagrams may illustrate parts of modules, segments, or codes including one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "unit" as used herein means, but is not limited to, a software or hardware component, such as a field programmable gate array (FPGA) or application specific integrated circuit (ASIC), which performs certain tasks. A unit may advantageously be configured to reside on an addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units". In addition, the components and "units" may be implemented such that they are executed on one or more central processing units (CPUs) in a device or a secure multimedia card. Further, a "unit" may include at least one processor in an embodiment. Each "unit" herein may comprise circuitry.

A description will be given below of a basic structure of a 5G system using a millimeter wave (mmW) band with reference to FIGS. 1A to 1E to help the understanding of the disclosure.

FIG. 1A is a block diagram illustrating a radio access network (RAN) and a core network (CN) according to various embodiments.

According to various embodiments, a RAN 150 may include at least one distributed unit (DU) 151, at least one central unit-control plane (CU-CP) 152, or at least one central unit-user plane (CU-UP) 153. Although the RAN 150 is shown as connected to at least one remote unit (or radio unit) (RU) 161, this is exemplary, and the at least one RU 161 may be connected to the RAN 150 or included in the RAN 150. The RAN 150 may be an open RAN (O-RAN). In this case, the DU 151 may be an open DU (O-DU), the CU-CP 152 may be an open CU-CP (O-CU-CP), the CU-UP 153 may be an open CU-UP (O-CU-UP), and the RU 161 may be an open RU (O-RU).

According to various embodiments, the RU 161 may perform communication with a UE 160. The RU 161 may be a logical node that provides low-physical layer (PHY) functionalities and radio frequency (RF) processing. The DU 151 may be a logical node that provides functionalities of the radio link control (RLC) layer, the medium access control (MAC) layer, and the high-PHY layer, and connected to, for example, the RU 161. The CUs 152 and 153 may be logical nodes that provide functionalities of the radio resource control (RRC), the service data adaptation protocol (SDAP), and the packet data convergence protocol (PDCP). The CU-CP 152 may be a logical node that provides functionalities of the control-plane parts of the RRC and the PDCP. The CU-UP 153 may be a logical node that provides functionalities of the user-plane parts of the SDAP and the PDCP.

According to various embodiments, a core network (e.g., 5G core (5GC)) 154 may include at least one of an access and mobility management function (AMF) 155, a user plane function (UPF) 156, or a session management function (SMF) 157. The AMF 155 may provide a function for access and mobility management on a UE basis. The SMF and/or UPF may provide a session management function. The UPF 156 may transmit DL data received from a data network to the UE 160 or transmit UL data received from the UE 160 to the data network. For example, the CU-CP 152 may be connected to the AMF 155 via an N2 interface (or an NG application protocol (NGAP) interface). The AMF 155 may be connected to the SMF 157 via an N11 interface. The CU-UP 153 may be connected to, for example, the UPF 156 via at least an N3 interface.

According to various embodiments, a gNB 101 of 5G NR may include the RU 161. The gNB 101 of FIG. 1A has been described as based on an O-RAN, its implementation type is not limited, and those skilled in the art will understand that the gNB 101 may be implemented in the form of a gNB based on a virtual RAN (V-RAN) or a cloud RAN (C-RAN), or in the form of a legacy BS.

Figure 1B:
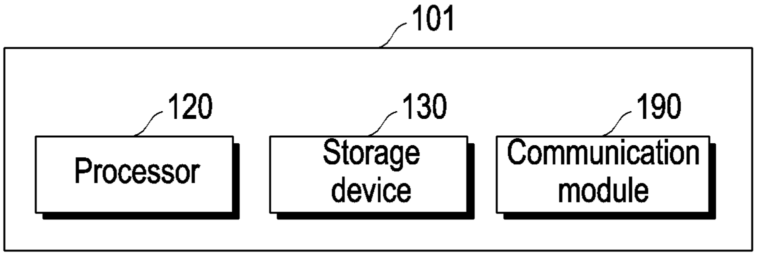
FIG. 1B is a block diagram illustrating a hardware configuration of a next-generation Node B (gNB) according to various example embodiments.

FIG. 1B is a block diagram illustrating a hardware configuration of a gNB according to various embodiments.

According to various embodiments, the gNB 101 (or an electronic device configured to execute the functions of the gNB 101) may include at least one of a processor 120 (including processing circuitry), a storage device 130, or a communication module 190 including communication circuitry.

According to various embodiments, the processor 120 may, for example, control at least one other component (e.g., a hardware or software component) of the gNB 101 (or the electronic device configured to perform the functions of the gNB 101) connected to the processor 120 by executing software (e.g., a program), and perform various data processes or operations. According to an embodiment, as at least some of the data processes or the operations, the processor 120 may store a command or data received from another component in the storage device 130, process the command or data stored in the storage device 130, and store result data in the storage device 130. According to an embodiment, the processor 120 may include at least some of a CPU, an application processor, a neural processing unit (NPU), or a communication processor. However, the type of the processor 120 is not limited. The NPU may include a hardware structure specialized for processing an artificial intelligence model. The artificial intelligence model may include, but not limited to, machine learning (e.g., reinforcement learning, supervised learning, unsupervised learning, or semi-supervised learning). The artificial intelligence model may include a plurality of artificial neural network layers. An artificial neural network may be one or a combination of two or more of, but not limited to, a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network. Additionally or alternatively to the hardware structure, the artificial intelligence model may include a software structure. It will be understood by those skilled in the art that as far as it is capable of storing data like a disk (e.g., a hard disk drive (HDD)), any device may be used as the storage device 130. Each "processor" herein includes processing circuitry.

According to various embodiments, the storage device 130 may store various data used by at least one component (e.g., the processor 120 or the communication module 190) of the gNB 101 (or the electronic device configured to execute the functions of the gNB 101). The data may include, for example, software and input data or output data for instructions related to the software.

According to various embodiments, the communication module 190 may support establishment of a direct (e.g., wired) communication channel or a wireless communication channel and communication through the established communication channel between the gNB 101 (or the electronic device configured to execute the functions of the gNB 101) and an external electronic device (e.g., an E2 node). The type of the communication module 190 is not limited, as long as it is capable of supporting an E2 interface, for example. When the gNB 101 and the RAN 150 are implemented as a single device, the communication module 190, with communication circuitry, may be an interface for both of the entities.

Figure 1C:
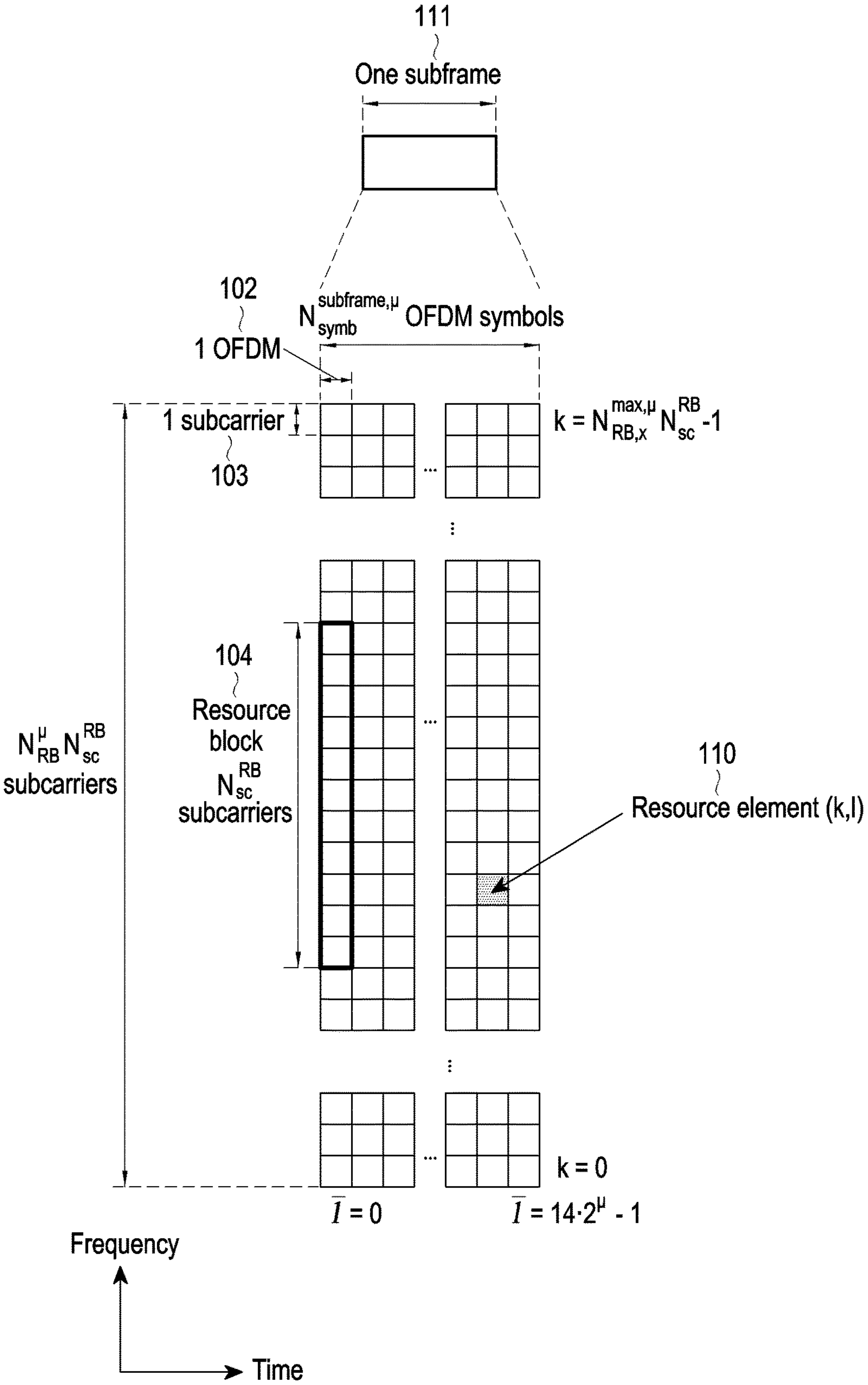
FIG. 1C is a diagram illustrating a basic structure of a time-frequency area, which is a radio resource area carrying data or a control channel in a $5^{th}$ generation (5G) system.

FIG. 1C is a diagram illustrating the basic structure of a time-frequency area, which is a radio resource area carrying data or a control channel in a 5G system.

In FIG. 1C, the horizontal axis represents time, and the vertical axis represents frequency. In the time and frequency domains, a basic unit of resources is a resource element (RE) 110, which may be defined as one OFDM symbol 102 on the time axis by one subcarrier 103 on the frequency axis. In the frequency domain, $$N_{sc}^{RS}$$

(e.g., 12) consecutive REs may form one resource block (RB) 104. In FIG. 1, $$N_{symb}^{subframe,\mu}$$

is the number of OFDM symbols per subframe 111 for a subcarrier spacing (SPS) configuration μ, and for a more detailed description of the resource structure in the 5G system, refer to TS 38.211 section 4.

Figure 1D:
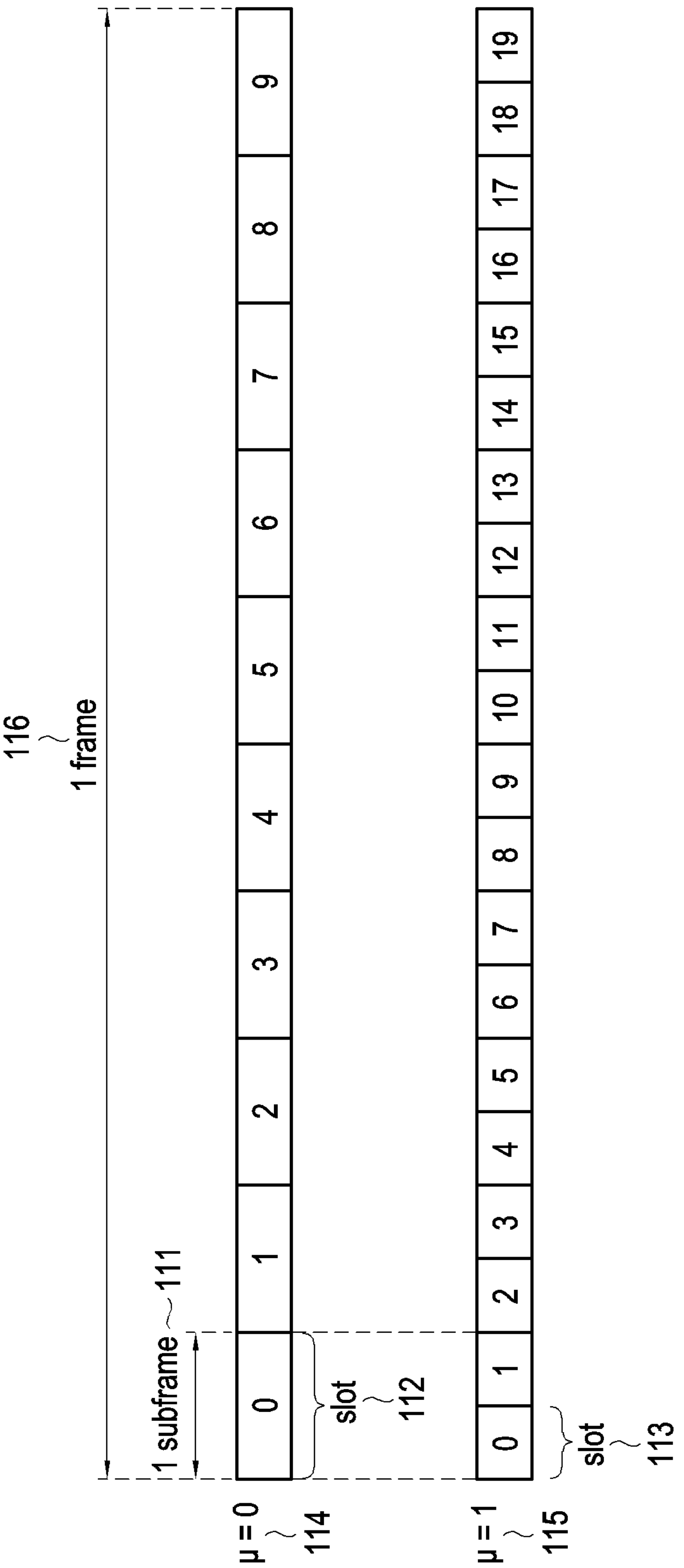
FIG. 1D is a diagram illustrating a slot structure considered in a 5G system.

FIG. 1D is a diagram illustrating a slot structure considered in a 5G system.

In FIG. 1D, an exemplary structure of a frame 116, a subframe 111, and slots 112 and 113 is illustrated. One frame 116 may be defined as 10 ms. One subframe 111 may be defined as 1 ms, and thus, one frame 116 may include a total of 10 subframes 111. One slot 112 or 113 may be defined as 14 OFDM symbols (e.g., the number of symbols per slot, $$N_{symb}^{slot} = 14).$$

One subframe 111 may include one or more slots 112 or 113, and the number of slots per subframe may be different according to an SCS (Subcarrier Spacing) configuration value μ 114 or 115. In an example of FIG. 1C, a case of μ=0 114 and a case of μ=1 115 are illustrated as SCS configuration values. When μ=0 114, one subframe 111 may include one slot 112, and when μ=1 115, one subframe 111 may include two slots 113. That is, the number of slots per subframe, $$N_{slot}^{subframe,\mu}$$

may vary according to the SCS configuration value μ, and accordingly, the number of slots per frame, $$N_{slot}^{frame,\mu}$$

may vary.

Figure 1E:
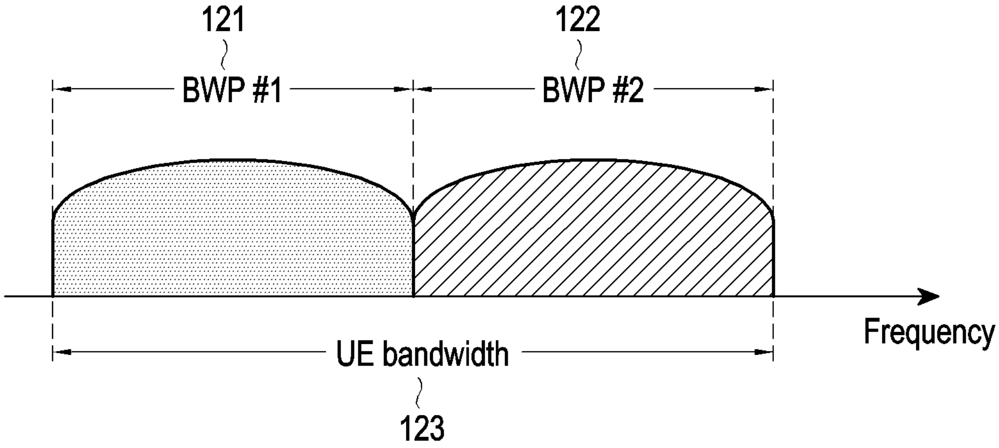
FIG. 1E is a diagram illustrating an exemplary bandwidth part (BWP) configuration in a 5G system.

FIG. 1E is a diagram illustrating an exemplary bandwidth part (BWP) configuration in a 5G system.

In FIG. 1E, an example in which a UE bandwidth 123 is configured to include two BWPs, that is, BWP #1 121 and BWP #2 122 is shown. A gNB may configure one or more BWPs for a UE. For each BWP, "locationAndBandwidth" indicates the location and bandwidth of the BWP in the frequency domain, "subcarrierSpacing" indicates an SCS to be used in the BWP, "cyclicPrefix" may configure information indicating whether an extended cyclic prefix (CP) is used in the BWP.

A BWP configuration supported by the 5G may be used for various purposes.

According to some embodiments, when a bandwidth supported by a UE is smaller than a system bandwidth, this may be supported through the BWP configuration. For example, the gNB may configure the frequency position of a BWP for the UE so that the UE may transmit and receive data at the specific frequency position within the system bandwidth.

According to an embodiment, the gNB may configure a plurality of BWPs for the UE for the purpose of supporting different numerologies. For example, to support data transmission and reception using both of an SCS of 15 kHz and an SCS of 30 kHz for the UE, the gNB may configure two BWPs with the SCSs of 15 kHz and 30 kHz, respectively. The different BWPs may be multiplexed in frequency division multiplexing (FDM), and when data is transmitted/received with a specific SCS, the BWP configured with the specific SCS may be activated.

According to an embodiment, to reduce power consumption of the UE, the gNB may also configure BWPs having different bandwidths for the UE. For example, when the UE supports a very large bandwidth, for example, 100 MHz and always transmits and receives data using the bandwidth, the UE may have very large power consumption. Particularly, unnecessary monitoring of a DL control channel with a large bandwidth of 100 MHz in the absence of traffic may be very inefficient in terms of power consumption. For the purpose of reducing power consumption of the UE, the gNB may configure a BWP with a relatively small bandwidth, for example, a BWP of 20 MHz for the UE. In the absence of traffic, the UE may perform a monitoring operation in the 20-MHz BWP, whereas when data is generated, the UE may transmit/receive the data in the 100-MHz BWP according to an instruction from the gNB.

Figure 2:
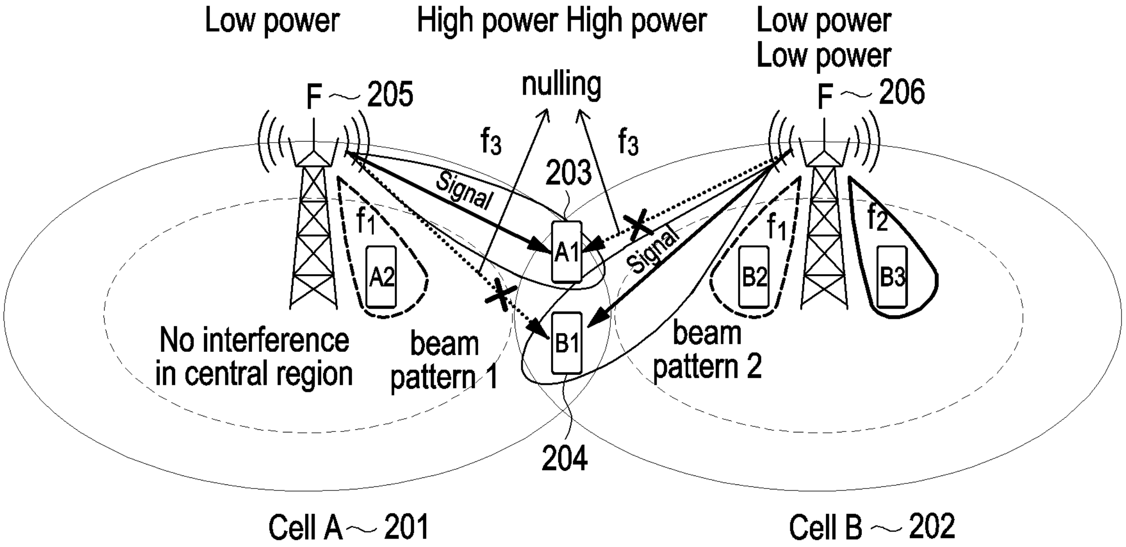
FIG. 2 is a diagram illustrating a coordinated multi-point (CoMP) operation for a user equipment (UE) at a cell edge according to various example embodiments.

FIG. 2 is a diagram illustrating a CoMP operation for a UE at a cell edge according to various embodiments. Each embodiment herein may be used in combination with any other embodiment described herein.

According to various embodiments, the types of CoMP techniques applicable when cell(s) transmits data to a UE may be classified according to a degree of coordination between cells and a traffic load. For example, in coordinating scheduling (CS) and coordinating beamforming (CB) for DL CoMP, one transmission cell may be selected from among cooperative cells to minimize or reduce interference signals for cell-edge UEs and communicate with a UE. For example, interference information may be transmitted on a cell basis in inter-cell interference coordination (ICIC), whereas channel information may be transmitted on a user basis in CS CoMP. For example, Cell A 201 and Cell B 202 cooperate to avoid interference by allocating different frequency resources to UE A1 203 and UE B1 204 located at a cell edge.

Referring to FIG. 2, when a CB CoMP operation is performed, different spatial resources (beam pattern 1 and beam pattern 2) may be allocated to UE A1 203 and UE B1 204 by using an antenna technology, and the same frequency resource f3 may be allocated to UE A1 203 and UE B1 204. For example, as a main beam is allocated to a UE to be served and a null beam is allocated to a neighbor cell UE, interference may be alleviated. Accordingly, UE A1 203 and UE B1 204 may receive data only from their serving cells, Cell A 201 and Cell B 202, respectively, even though they use the same frequency resource f3.

According to various embodiments, a CB CoMP operation may be used together with a CS CoMP operation. For example, when the CS CoMP operation and the CB COMP operation are used together, Cell A 201 and Cell B 202 may cooperate to allocate different frequency resources, f3 and f2 and different spatial resources, beam pattern 1 and beam pattern 2 to UE A1 203 and UE B1 204. Accordingly, UE A1 203 and UE B1 204 may receive data only from their serving cells, Cell A 201 and Cell B 202, respectively. Therefore, the serving UE located at the cell edge may avoid interference with the other party's signal, and the reception quality of a signal may be improved, through the CoMP operation.

According to various embodiments, a serving gNB 205 and a helping gNB 206 may be connected (directly or indirectly) to each other via at least a backhaul such as an Xn interface, the UE located for example within at least the serving cell 201 may be referred to as the serving UE 203, and the serving UE 203 may refer to a UE (hereinafter, a target CoMP UE) for which a CoMP operation is to be performed by the helping gNB 206. The helping gNB 206 may refer to a gNB performing CoMP for the serving UE 203. The serving gNB 205 and/or the helping gNB 206 may be, but not limited to, for example, the gNB 101.

Figure 3:
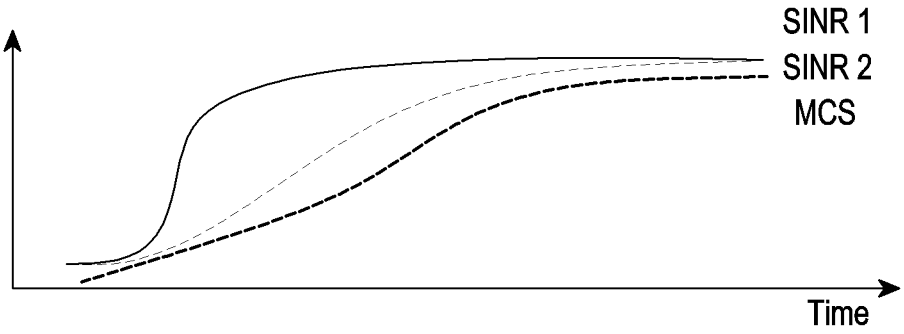
FIG. 3 is a diagram illustrating a modulation and coding scheme (MCS) level that is increased according to a signal-to-interference and noise ratio (SINR) according to various example embodiments.

FIG. 3 is a diagram illustrating an MCS level that is increased according to an SINR according to various embodiments.

According to various embodiments, a CoMP operation for which a link adaptation algorithm is considered may be performed, but not limited to, on a slot basis, like a DL or UL scheduling unit in the 5G NR system. For example, in the case of a 30-kHz SCS 103, one slot may be 0.5 ms, and the duration of each slot may be flexible for each SCS according to various numerologies. In the CoMP operation, there is no set rule or specification to determine a UE for which the CoMP operation is to be performed in every slot. In the CoMP operation considering a general link adaptation algorithm, a serving UE (e.g., target CoMP UE) for which the CoMP operation is performed during a predetermined duration in every slot may be the same or changed. For example, when the serving UE is changed, a serving UE may be determined according to a scheduling metric. For example, the scheduling metric may be a round robin (RR) method in which selections are made cyclically, or a proportional fair (PF) method in which a selection is made based on the ratio of an instantaneous throughput to an average throughput.

According to various embodiments, even when the SINR of a radio channel between a UE and a gNB is high, a low MCS level for data transmission may lead to a low data rate. In addition, when the SINR of the radio channel is low, even an increase in the MCS level for the data transmission may lead to a low data rate and failure of the data transmission. Accordingly, application of an appropriate MCS level according to the SINR situation of a radio channel may increase a data rate according to a channel environment.

According to various embodiments, when hybrid automatic repeat request (HARQ) is applied, a maximum or large allowed number of retransmissions may affect determination of an MCS level. In a situation with a high SINR, a predetermined number of or more HARQ acknowledgment (ACK) feedback receptions are required to increase an MCS level according to a link adaptation algorithm. However, when the SINR rapidly increases, it may be difficult to rapidly increase the MCS level by waiting for the predetermined number of one or more HARQ ACK feedback receptions.

Referring to FIG. 3, SINRs or MCS levels over time (on the X axis) are shown. For example, the SINR increases more rapidly in the case of SINR 1 than in the case of SINR 2. For example, when the MCS level increases according to a predetermined of number of HARQ ACK feedback receptions, the MCS level may increase at the same rate regardless of the situations of SINR 1 and SINR 2. In other words, since the increase of the MCS level requires the predetermined number of HARQ ACK receptions, the MCS level increases at the same rate. Therefore, when it is possible to rapidly increase the MCS level in the case of a high SINR, a packet loss rate and latency may be reduced.

Figure 4A:
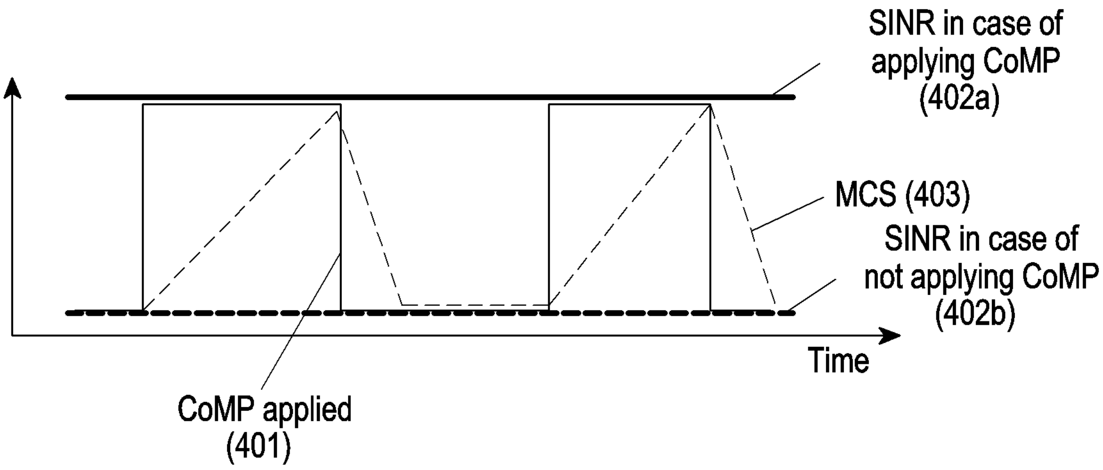
FIG. 4A is a diagram illustrating the change trends of an SINR and an MCS level based on performing of a CoMP operation according to a comparative example for comparison with various example embodiments.
Figure 4B:
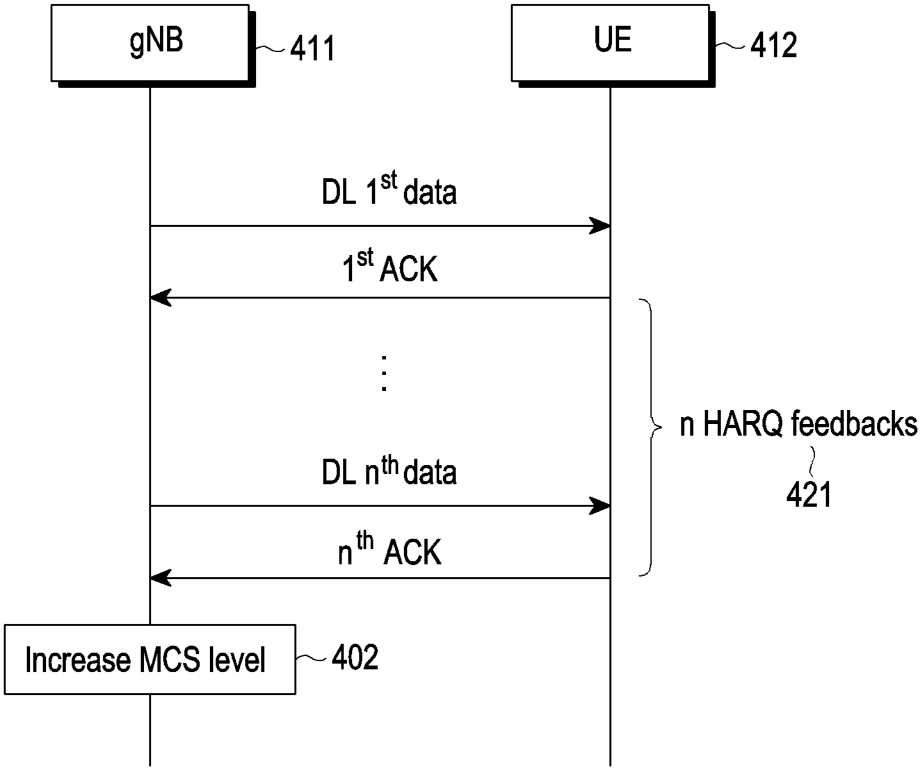
FIG. 4B is a diagram illustrating an increase in an MCS level according to hybrid automatic repeat request (HARQ) acknowledgment (ACK) retransmission according to a comparative example.
Figure 4C:
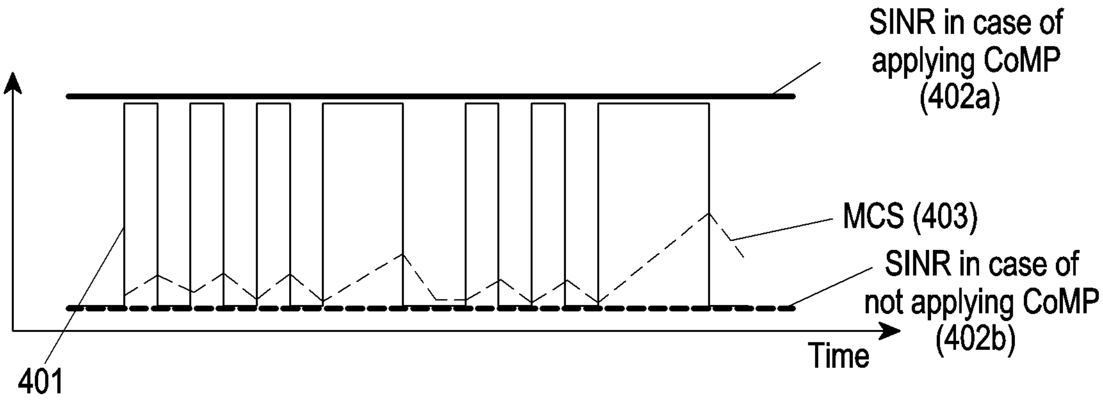
FIG. 4C is a diagram illustrating the change trends of an SINR and an MCS level based on performing of a CoMP operation according to a comparative example.

FIG. 4A is a diagram illustrating the change trends of an SINR 402 and an MCS level 403 according to performing of a CoMP operation according to a comparative example for comparison with various embodiments. FIG. 4B is a diagram illustrating an increase in an MCS level according to HARQ ACK retransmissions according to a comparative example. FIG. 4C is a diagram illustrating the change trends of an SINR and an MCS level 403 according to a CoMP operation according to a comparative example. At least some of operations performed by a gNB according to the comparative example may also be performed by a gNB according to various embodiments.

According to various embodiments, an SINR 402*a* in the case of applying a CoMP operation may be larger than an SINR 402*b* in the case of not applying a CoMP operation. Referring to FIG. 4A, a solid line 401 may indicate the case in which a CoMP operation is performed and the case in which the CoMP operation is not performed. For example, when the solid line 401 is high, this may indicate that the CoMP operation is performed. In this case, the relatively high SINR 402*a* may be obtained. For example, when the solid line 401 is low, it may indicate that the CoMP operation is not performed. In this case, the relatively low SINR 402*b* may be obtained. For example, while the CoMP operation is shown as performed during about 50% of a time period, this is illustrative, not limiting the disclosure. The transition of the solid line 401 from low to high may indicate an increase in an SINR as the CoMP operation is performed. Referring to the solid line 401 indicating an SINR according to performing of a CoMP operation in FIG. 4C, a period during which the CoMP operation is performed may be shorter than in the example of FIG. 4A. In the example of FIG. 4A, the CoMP operation is performed during a sufficient time period, so that the MCS level 403 may increase to a certain level, whereas in the example of FIG. 4C, the CoMP operation is performed during a relatively short time period, compared to that of FIG. 4A, and thus the MCS level 403 may increase only up to a lower level than in FIG. 4A and then decrease. In other words, even though the SINR increases due to the CoMP operation, if a sufficient time to increase the MCS level is not secured by the link adaptation algorithm, an increment of the throughput of data transmission may be smaller than that of the SINR Referring to FIG. 4B, the MCS level is shown as increasing according to a predetermined number of HARQ ACK feedback 421 receptions. For example, according to an HARQ operation in a legacy wireless communication system, after one data packet is transmitted, an ACK indicating successful reception or a NACK indicating reception failure may be received from a data packet receiver. In general, for an MCS level selected in consideration of channel characteristics, a channel state may be identified based on the number of receptions of an ACK response indicating a data feedback, to identify whether a channel state between a UE and a gNB is good.

Referring to FIG. 4B, when receiving a predetermined number of (n) HARQ ACK feedbacks 421 from a UE 412, a gNB 411 may increase an MCS level (402). For example, when the gNB 411 transmits a first DL data packet to the UE 412, the UE 412 may transmit a first ACK indicating reception of the first data packet. Then, when the gNB 411 transmits an $n^{th}$ DL data packet to the UE 412 and the UE 412 transmits an $n^{th}$ ACK to the gNB 411 (421), the gNB 411 may increase an MCS level by a predetermined level (e.g., by +1 each time), determining that the channel quality with the UE 412 is good (402).

In general, when a CoMP operation is performed according to a link adaptation algorithm, a time taken for receiving n HARQ feedbacks is required to increase an MCS level by the link adaptation algorithm, even when the SINR increases rapidly, as described above. For example, since a time taken for receiving n HARQ ACKs is required to increase the MCS level 403, when CoMP is applied for a short time and an SINR increment (the difference between the SINRs 402*a* and 402*b*) is large depending on whether the CoMP operation is performed, it may be difficult to increase the MCS level sufficiently, unless a time period is secured, during which the MCS level may be increased by as much as the SINR increment.

According to various embodiments, when a target CoMP UE is changed in every slot or every short period, the SINR of the target CoMP UE may fluctuate. Referring to FIG. 4C, when there are multiple target CoMP UEs from the perspective of a gNB performing the CoMP operation, the gNB may perform the CoMP operation for the multiple UEs in the time domain. In this case, at least one of the multiple UEs may be determined as a target CoMP UE, and the determination may be made based on a CSI feedback period for DL and an SRS transmission period for UL.

Figure 5A:
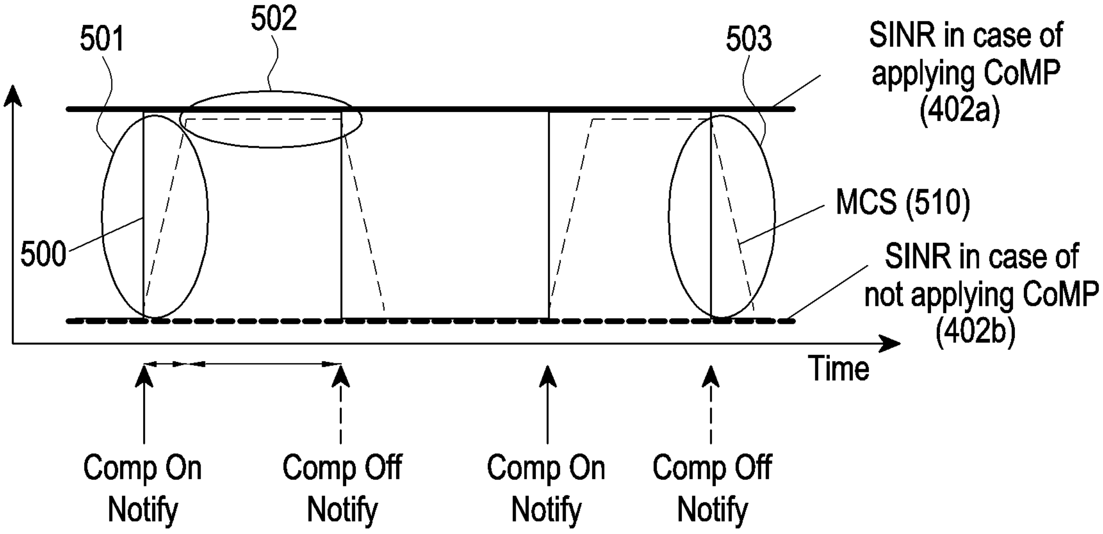
FIG. 5A is a diagram illustrating the change trends of an SINR and an MCS level based on performing of a CoMP operation according to an example embodiment.
Figure 5B:
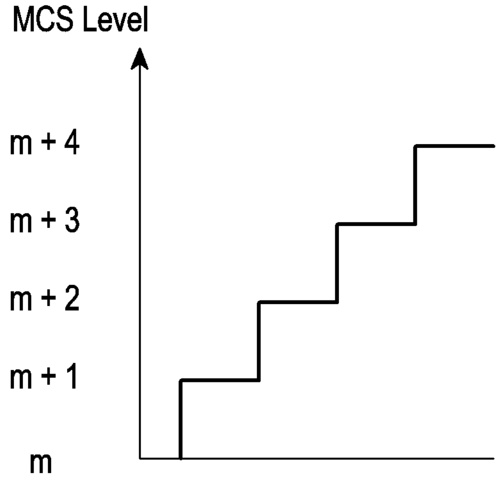
FIG. 5B is an enlarged view illustrating a rising period of an MCS level of FIG. 5A.
Figure 5C:
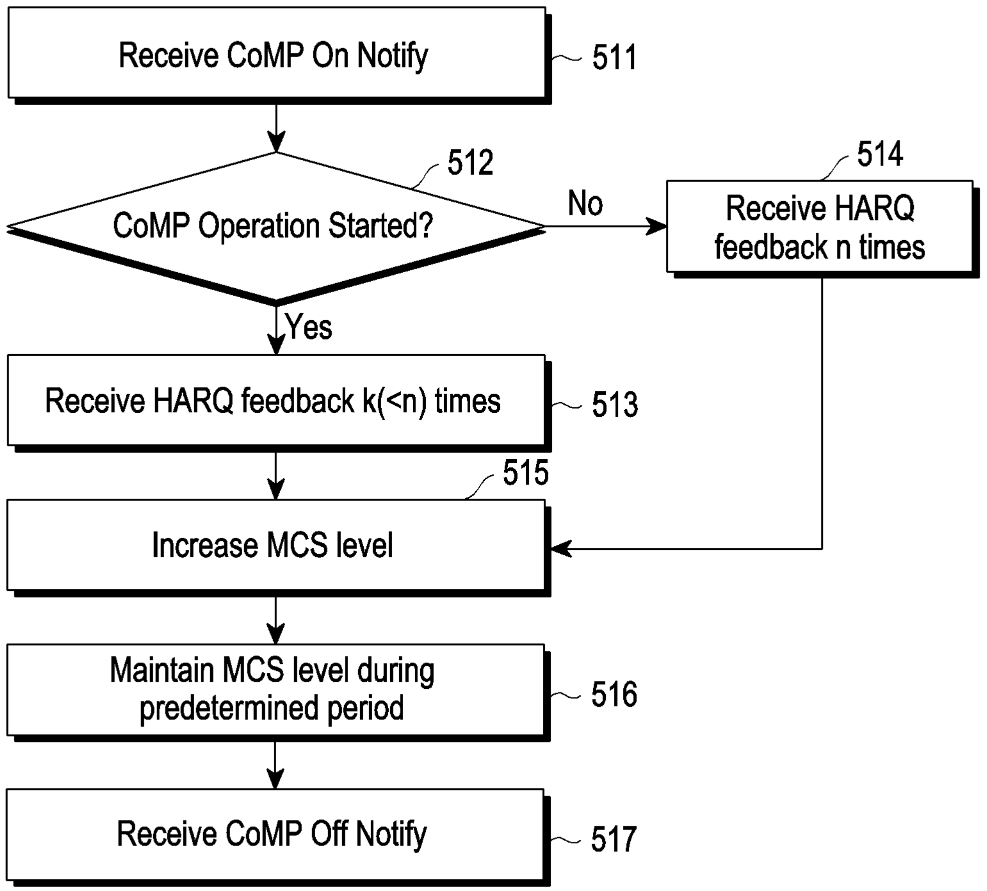
FIG. 5C is a flowchart illustrating an operation of adjusting an MCS level according to whether a CoMP operation is applied together with a link adaptation algorithm operation.

FIG. 5A is a diagram illustrating the change trends of an SINR and an MCS level when a CoMP operation is performed according to an embodiment. FIG. 5B is an enlarged view illustrating a rising period of the MCS level of FIG. 5A. FIG. 5C is a flowchart illustrating an operation of adjusting an MCS level according to whether a CoMP operation is applied together with a link adaptation algorithm operation.

Referring to FIG. 5A, a solid line 500 may indicate whether a CoMP operation is applied, and a dotted line 510 may indicate a change trend of an MCS level. In addition, a rising period 501, a holding period 502, and a falling period 503 of the MCS level are shown.

According to various embodiments, while the CoMP operation is being performed, the MCS level may be increased and maintained by the link adaptation algorithm. Referring to FIG. 5A, the SINR may increase to the relatively high value 402*a* at the on timing (CoMP On Notify) of the CoMP operation, indicated by a message notifying the start of the CoMP operation, and may increase to a certain level faster than in the comparative example during the rising period 501 from the on timing (CoMP On Notify). Thereafter, the MCS level may be maintained while the CoMP operation is being performed (e.g., during the holding period 502). Compared to the case of FIGS. 4A and 4C, an increase inclination of the MCS level may be large and the MCS level may increase at a high rate in FIG. 5A during the rising period 501 of the MCS level.

The gNB 101 according to various embodiments may increase the MCS level relatively fast based on reduction of the number of HARQ feedbacks required for increasing the MCS level and/or an increase of an MCS level increment in the link adaptation algorithm in a general case, which will be described later. Although the MCS level does not sufficiently increase or is not sufficiently maintained, relative to an SINR increment in the case of FIGS. 4A and 4C, it may be noted in FIG. 5A that the MCS level is maintained even after reaching a certain level.

According to various embodiments, an on timing of a CoMP operation may be configured in consideration of an SINR increment (e.g., the difference between 402*a* and 402*b* in FIGS. 4A, 4C, and 5A) according to whether the CoMP operation is performed.

According to various embodiments, since it is not necessary to maintain the MCS level high while the CoMP operation is not performed, the gNB 101 may fast decrease the MCS level according to an off timing of the CoMP operation. The illustrated MCS level decrease rate during the MCS falling period 503 may be higher than the MCS level decrease rate illustrated in FIGS. 4A, 4B and 4C, which should not be construed as limiting. When the MCS level rapidly decreases during a period in which CoMP operation is not performed, an unnecessary data transmission loss rate and the probability of CRC failure may be reduced, and throughput loss caused by HARQ retransmission may be minimized or reduced.

According to various embodiments, a serving gNB (hereinafter, referred to as a first gNB) may rapidly increase an MCS level according to an application time of a CoMP operation. For example, the first gNB may receive a notification indicating an on/off timing of the CoMP operation from a helping gNB (hereinafter, referred to as a second gNB) connected to the first gNB by a backhaul and performing a cooperative operation with the first gNB. For example, upon receipt of a notification (CoMP On Notify) of the start of the CoMP operation, the first gNB may recognize that the CoMP operation is performed at the indicated timing and maintained during a certain period until before receiving a notification (CoMP Off Notify) for terminating the CoMP operation. In other words, the second gNB may transmit the notification for terminating the CoMP operation after the certain duration. For example, the link adaptation algorithm may provide MCS level rising and holding periods based on CoMP On Notify and CoMP Off Notify. As such, as the rising period 501 and holding period 502 of the MCS level coincides with a period in which the CoMP operation is applied, a throughput gain for data transmission may be maximized or increased.

According to various embodiments, the first gNB may adjust the MCS level even before receiving fewer HARQ feedbacks than a predetermined number from a UE, by preliminarily reflecting an increment or decrement of the SINR based on whether the CoMP operation is performed in the link adaptation algorithm.

Referring to FIG. 5C, in operation 511, the first gNB may receive a CoMP On Notify message. In operation 512, the first gNB may identify whether to start a CoMP operation at a timing indicated by information included in the received message. When the CoMP operation is started (512—Yes), the first gNB may receive an HARQ feedback k times according to an SINR increment based on the performing of the CoMP operation in operation 513. The first gNB may increase an MCS level by a predetermined level (e.g., by 1) based on the k HARQ feedback receptions in operation 515. An HARQ feedback increasing the MCS level is an ACK, and an HARQ feedback decreasing the MCS level is a NACK. When the CoMP operation is not started (512—No), the first gNB may receive the HARQ feedback n times in operation 514. Based on the n HARQ feedback receptions, the first gNB may increase the MCS level by the predetermined level (e.g., by 1) in operation 515. Herein, n may be a natural number greater than k, and may be, but not limited to, a value set for a case in which the CoMP operation is not performed. As described above, as the MCS level increases based on the k HARQ feedback receptions, the MCS level may increase at a higher rate than based on the n HARQ feedback receptions. Thereafter, the MCS level may increase. In operation 516, the first gNB may maintain the MCS level during a predetermined period. Even though the MCS level converges to a certain level, when a NACK is received as an HARQ feedback, the MCS level may be decreased (not shown). The first gNB may receive CoMP Off Notify in operation 517. The first gNB may terminate the CoMP operation based on the reception of the CoMP off Notify. Before the termination, the first gNB may maintain the CoMP operation. When the CoMP operation is terminated, the first gNB may decrease the MCS level only based on a small number of HARQ feedback receptions in consideration of an SINR decrement.

According to various embodiments, the duration of the CoMP operation may be manually set according to the preference of a service operator. For example, when the SINR rapidly changes depending on whether the CoMP operation is performed, a time it takes for the link adaptation algorithm to converge the MCS level to the predetermined level by increasing (or decreasing) the MCS level may be determined by various factors such as the movement speed of a UE, a target area, frequency division duplex (FDD)/time division duplex (TDD), a slot pattern, the characteristics of an application service, and so on, and may vary depending on situations.

According to various embodiments, it may be necessary to manually set the holding period of the MCS level in consideration of an area in which the CoMP operation is performed and the characteristics of an operating system. For example, convergence to an appropriate MCS level depending on whether the CoMP operation is performed may indicate a situation in which DL data transmission is possible by satisfying a target block error rate (BLER). For reference, when a target BLER for the eMBB service is set to about 10 to 15%, a maximum or high throughput may be achieved. For example, a gNB (e.g., a helping gNB) may recognize the movement speed of the UE and manually set the target BLER. For example, when the movement speed of the UE is high, the MCS level may be set low in a rapidly changing channel environment. For example, a BLER required in a specific area may be set based on a database, and/or a higher BLER may be set in TDD in which an HARQ feedback reception rate is slower than that in FDD. In addition, since a data transmission amount and frequency are different depending on services of an application, the target BLER may be set in consideration of a service time required for each service of the application. As the target BLER target is set higher, the inclination of the MCS level may increase. The increase rate of the MCS level may be adjusted according to the setting of the target BLER.

According to various embodiments, a relatively low value less than 1% may be expected in the period 501 in which the MCS level is sharply increased, and a relatively high BLER may be expected in the period 503 in which the MCS level is rapidly decreased (e.g., see FIG. 5A). For example, the rising period 501 and the holding period 502 of the MCS level may be configured to satisfy or maximize quality of service (QoS) of a target CoMP UE. For example, for a UE using a non-guaranteed bit rate (non-GBR) service, a service time may be determined to be the smaller between a ratio of a data volume to an average throughput and a reporting period of a measurement report. Besides, a service time required for the application may be taken into account or a CoMP operation duration may be manually adjusted by the service operator.

According to an embodiment, conventionally, a criterion for selecting a target CoMP UE is based on information related to the channel quality of DL and UL signals, and thus may be determined by a CSI transmission period and an SRS transmission period. In contrast, the MCS level rising and holding periods may be considered in consideration of the link adaptation algorithm. "Based on" as used herein covers based at least on.

Figure 6A:
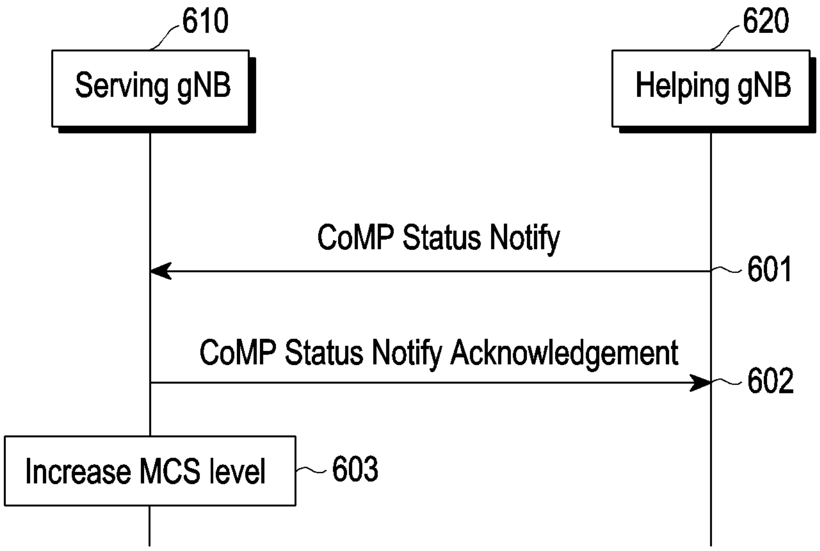
FIG. 6A is a diagram illustrating operations of a serving Gnb and a helping Gnb according to an example embodiment.
Figure 6B:
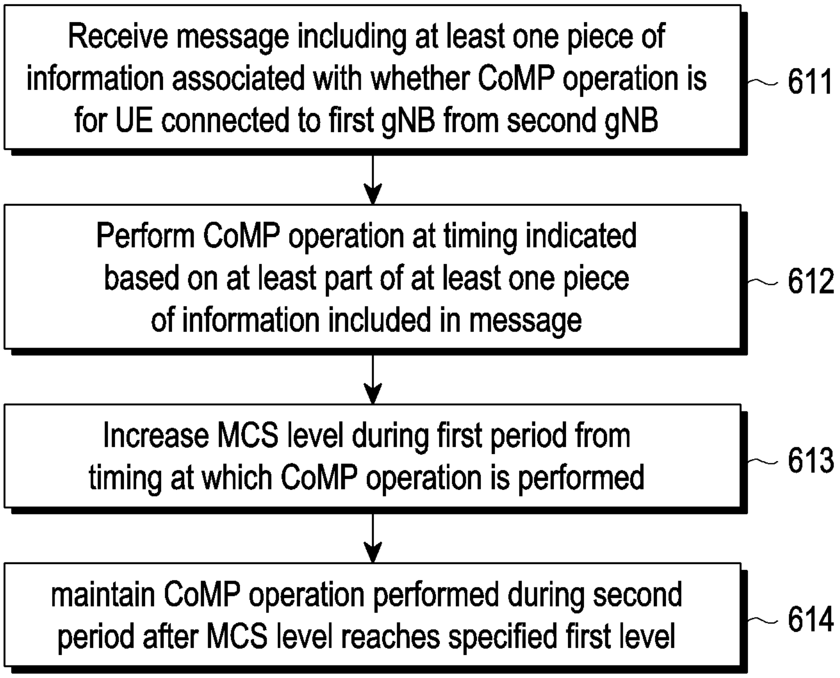
FIG. 6B is a flowchart illustrating an operation from the perspective of a serving Gnb according to an example embodiment.

FIG. 6A is a diagram illustrating operations of a serving gNB and a helping gNB according to an embodiment. FIG. 6B is a flowchart illustrating an operation from the perspective of the serving gNB according to an embodiment.

Referring to FIG. 6A, a helping gNB 620 may notify a serving gNB 610 connected through at least a wired backhaul such as an Xn interface of a CoMP operation status (e.g., on and/or off of the CoMP operation). In operation 601, the serving gNB 610 may receive a CoMP Status Notify message indicating the CoMP operation status. For example, the CoMP Status Notify message may include the status (On or Off) of the CoMP operation on a system frame number (SFN)/slot basis to the first gNB, and optionally include various pieces of scheduling-related information such as the position of a physical resource block (PRB) in which the CoMP operation is performed, the number of nulling layers in the case of beam nulling, and CSI-related information from which an SINR increment and/or decrement depending on whether the CoMP operation is applied may be derived. In operation 602, the serving gNB 610 may transmit a response (e.g., CoMP Status Notify Acknowledgment) indicating reception of the message to the helping gNB 620. For example, when the serving gNB 610 has successfully received the CoMP Status Notify message, the serving gNB 610 may transmit the CoMP Status Notify Acknowledgment, and otherwise, the serving gNB 610 may transmit a NACK. Serving gNB 610, for example, may increase MCS level at 603.

According to an embodiment, the serving gNB 610 servicing a target CoMP UE may recognize an on and/or off timing of the CoMP operation from a message indicating on/off of the CoMP operation between the serving gNB 610 and the helping gNB 620 performing the CoMP operation. For example, the serving gNB 610 may determine an MCS level increment and/or decrement based on the recognized on timing and/or off timing of the CoMP operation.

Referring to FIG. 6B, in operation 611, the first (e.g., serving) gNB 610 may receive a message including at least one piece of information related to whether a CoMP operation is performed for a UE connected to the first gNB 610 from the second gNB 620. The first gNB 610 may perform the CoMP operation at a timing indicated based on at least part of the at least one piece of information included in the received message in operation 612. The first gNB 610 may increase an MCS level during a first period (e.g., 501 of FIG. 5) from the timing at which the CoMP operation is performed in operation 613. The first gNB 610 may maintain the MCS level during a second period (e.g., 502 of FIG. 5) after the MCS level reaches a specified first level in operation 614.

Figure 7A:
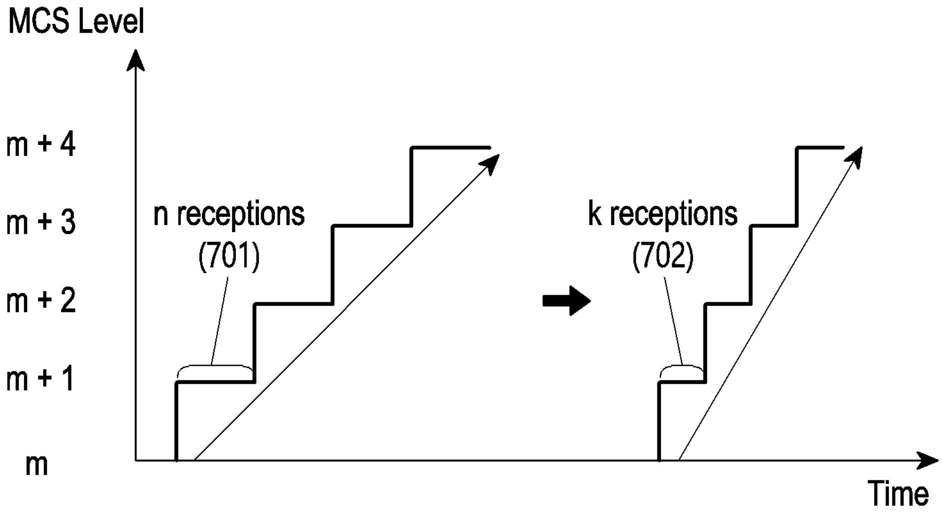
FIG. 7A is a diagram illustrating an increase in an MCS level according to the number of HARQ ACK receptions according to an example embodiment.
Figure 7B:
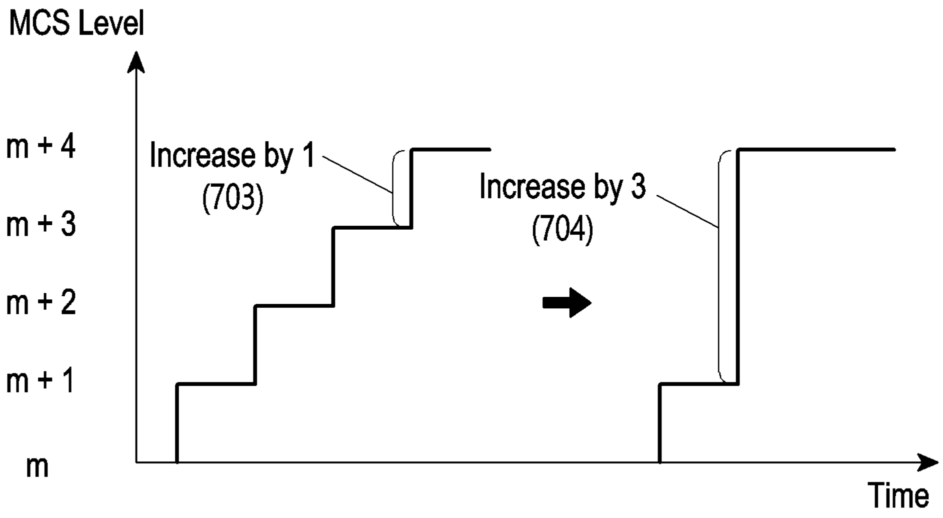
FIG. 7B is a diagram illustrating a case in which an MCS level is increased by 1 or larger according to an example embodiment.
Figure 7C:
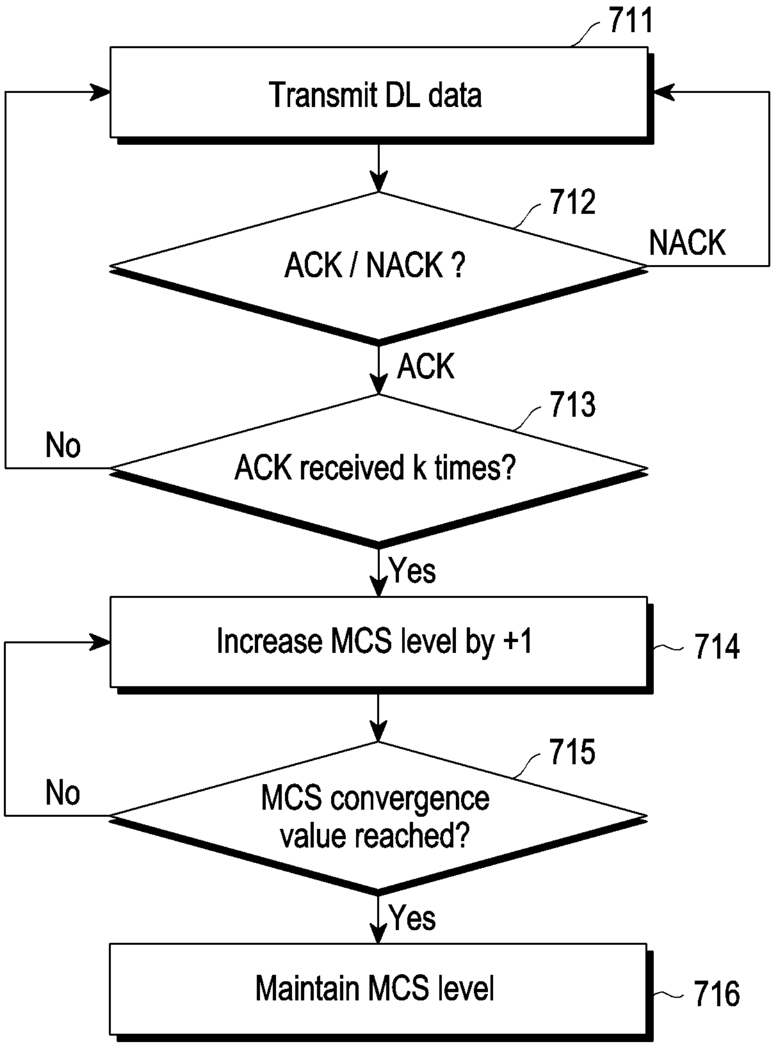
FIG. 7C is a flowchart illustrating an operation of rapidly increasing an MCS level according to an example embodiment.

FIG. 7A is a diagram illustrating an increase in an MCS level according to the number of HARQ ACK receptions according to an embodiment. FIG. 7B is a diagram illustrating a case in which the MCS level is increased by 1 or larger according to an embodiment. FIG. 7C is a flowchart illustrating an operation of rapidly increasing an MCS level according to an embodiment.

In general, a link adaptation algorithm includes a weight-related parameter that increases or decreases an MCS level according to an HARQ ACK/NACK reception. The MCS level may be increased or decreased by increasing the weight. The weight may be used to determine the number of HARQ feedback receptions after which an MCS level is to be increased or the number of NACK receptions after which the MCS level is to be decreased. For example, the weight may include parameters related to increasing or decreasing the MCS level.

Referring to FIG. 7A, it may be noted that an inclination in the case where the MCS level is increased by 1 every k ACK receptions 702 is larger than an inclination in the case where the MCS level is increased by 1 every n ACK receptions 701, wherein k is an integer less than n.

According to various embodiments, the MCS level may be rapidly increased by reducing the number of HARQ feedback receptions. Further, when a condition for increasing the MCS level (e.g., the number of HARQ feedback receptions) is satisfied, the MCS level may be increased by 1 or larger, thereby rapidly increasing the MCS level to a convergence value. For example, the convergence MCS level may be predicted based on a maximum/minimum value of MCS levels reached when the CoMP operation was applied or not applied in the past. Alternatively, the convergence MCS level may be derived by referring to changes in a channel quality indication (CQI) value in a periodic/aperiodic CSI report transmitted by the UE.

According to various embodiments, the first gNB 610 may adjust the MCS level by preliminarily reflecting an SINR increment depending on whether the CoMP operation is performed in the link adaptation algorithm. For example, in relation to the method of preliminarily reflecting the SINR increment in the link adaptation algorithm, referring to FIG. 7B, each time the number of HARQ ACK receptions reaches a threshold, the first gNB having knowledge of an on timing of the CoMP operation may increase the MCS level by 3, as indicated by reference numeral 704, rather than by 1, as indicated as reference numeral 703.

According to various embodiments, when it is possible to predict an SINR increment depending on whether the CoMP operation is performed, an MCS level increment mapped to the SINR increment may be identified. For example, a manufacturer or a service provider may determine an MCS level mapped to the SINR increment from an SINR-to-MCS mapping table.

Referring to FIG. 7C, an operation of a first gNB for more rapidly increasing an MCS level is shown. The first gNB may transmit DL data in operation 711, and receive an ACK or NACK feedback for the DL data reception from a UE in operation 712. For example, upon receipt of a NACK from the UE (712—NACK), the first gNB may repeat operation 711 to retransmit the DL data. For example, upon receipt of an ACK from the UE (712—ACK), the first gNB identifies whether k ACKs have been received (k is an integer less than the number n of HARQ feedback receptions after which an MCS level is generally to be increased, indicating a threshold for increasing the MCS level) in operation 713. When the number of ACK receptions is n or k, the first gNB may increase the MCS level by 1 in operation 714 (yes in 713). For example, when the first gNB has prior knowledge of an MCS level convergence value, the first gNB may increase the MCS level by 1 or more to rapidly reach the convergence value (715—no). In operation 716, the first gNB may maintain the MCS level that has reached the convergence value until the CoMP operation is terminated. Even though the MCS level converges to a certain level, when a NACK is received as an HARQ feedback, the MCS level may be decreased (not shown).

According to various embodiments, a method of operating a first BS for performing wireless communication with a UE includes receiving a message including at least one piece of information associated with whether a CoMP operation is performed for a UE connected (directly or indirectly) to the first BS from a second BS connected to the first BS, when the received message includes information indicating start of the CoMP operation, performing the CoMP operation at a timing indicated based on at least part of the at least one piece of information included in the received message, increasing an MCS level during a first period, and maintaining the CoMP operation performed during a second period after the MCS level reaches a specified first level based on the increase during the first period, and when the received message includes information indicating termination of the CoMP operation, terminating the CoMP operation at a timing indicated based on at least part of the at least one piece of information included in the received message, and decreasing the MCS level during a third period.

According to various embodiments, the method includes increasing the MCS level by 1 or larger, when the number of HARQ ACK receptions reaches a threshold, or decreasing the MCS level by 1 or larger, when the number of HARQ NACK receptions reaches a threshold.

According to various embodiments, the second period is determined based on a minimum or low value between a service time based on a data volume per average throughput of the UE and a period of a measurement report.

According to various embodiments, at least one of the first period, the second period, or the third period is settable to any duration by a service operator.

According to various embodiments, the first BS and the second BS are connected (directly or indirectly) to each other by a backhaul, and the received message includes information indicating whether the CoMP operation is performed on a slot basis for an SFN, and includes at least one of a position of a PRB in which the CoMP operation is performed, the number of nulling layers, or information related to an SINR increment according to the start of the CoMP operation.

According to various embodiments, the method further includes transmitting an ACK to the second BS in response to the received message.

According to various embodiments, the method includes identifying an SINR increment based on (e.g., according to) the start of the CoMP operation based on the at least part of the at least one piece of information included in the received message, and increasing the MCS level by 1 or larger based on the SINR increment, or identifying an SINR decrement based on (e.g., according to) the termination of the CoMP operation based on the at least part of the at least one piece of information included in the received message, and decreasing the MCS level by 1 or larger based on the SINR decrement.

According to various embodiments, the increase of the MCS level during the first period is adjusted by adjusting a parameter related to the number of HARQ ACK/NACK receptions from the UE.

According to various embodiments, after the MCS level converges to the first level, the MCS level is maintained to be the first level during the second period.

According to various embodiments, the first level is determined based on at least one of an SINR increment based on (e.g., according to) the start of the CoMP operation, a maximum or high MCS level value reached in a previous CoMP operation, or a CQI value in a CSI report of the UE.

According to various embodiments, a first BS for performing wireless communication with a UE includes a transceiver and at least one processor including processing circuitry. The at least one processor is configured to receive a message including at least one piece of information associated with whether a CoMP operation is performed for a UE connected to the first BS from a second BS connected (directly or indirectly) to the first BS through the transceiver, when the received message includes information indicating start of the CoMP operation, perform the CoMP operation at a timing indicated based on at least part of the at least one piece of information to be included in the received message, increase an MCS level during a first period, and maintain the CoMP operation performed during a second period after the MCS level reaches a specified first level based on the increase during the first period, and when the received message includes information indicating termination of the CoMP operation, terminate the CoMP operation at a timing indicated based on at least part of the at least one piece of information to be included in the received message, and decrease the MCS level during a third period.

According to various embodiments, the at least one processor is configured to increase the MCS level by 1 or larger, when the number of HARQ ACK receptions reaches a threshold, or decrease the MCS level by 1 or larger, when the number of HARQ NACK receptions reaches a threshold.

According to various embodiments, the second period is determined based on a minimum or low value between a service time based on a data volume per average throughput of the UE and a period of a measurement report.

According to various embodiments, at least one of the first period, the second period, or the third period is settable to any duration by a service operator.

According to various embodiments, the first BS and the second BS are connected (directly or indirectly) to each other by a backhaul, and the received message includes information indicating whether the CoMP operation is performed on a slot basis for an SFN, and includes at least one of a position of a PRB in which the CoMP operation is performed, the number of nulling layers, or information related to an SINR increment according to the start of the CoMP operation.

According to various embodiments, the at least one processor is further configured to transmit an ACK to the second BS in response to the received message through the transceiver.

According to various embodiments, the at least one processor is configured to identify an SINR increment based on (e.g., according to) the start of the CoMP operation based on the at least part of the at least one piece of information to be included in the received message, and increase the MCS level by 1 or larger based on the SINR increment, or identify an SINR decrement based on (e.g., according to) the termination of the CoMP operation based on the at least part of the at least one piece of information to be included in the received message, and decrease the MCS level by 1 or larger based on the SINR decrement.

According to various embodiments, the at least one processor is configured to adjust the increase by adjusting a parameter related to the number of HARQ ACK/NACK receptions from the UE.

According to various embodiments, after the MCS level converges to the first level, the MCS level is maintained to be the first level during the second period.

According to various embodiments, the at least one processor is configured to determine the first level based on at least one of an SINR increment according to the start of the CoMP operation, a maximum or high MCS level value reached in a previous CoMP operation, or a CQI value in a CSI report of the UE.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B”, “at least one of A and B”, “at least one of A or B”, “A, B, or C”, “at least one of A, B, and C”, and “at least one of A, B, or C”, may include any one of, or all possible combinations of the items enumerated together in a corresponding one of the phrases. As used herein, such terms as “1st” and “2nd”, or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with”, “coupled to”, “connected with”, or “connected to” another element (e.g., a second element), it means that the element may be coupled with the other element directly (e.g., wiredly), wirelessly, or via at least a third element.

As used in connection with various embodiments of the disclosure, the term “module” may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., the gNB 101). For example, a processor (e.g., the processor 120) of the machine (e.g., the gNB 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term ‘non-transitory’ simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A method of operating a first base station (BS) for performing wireless communication with a user equipment (UE), the method comprising:

receiving a message including at least one piece of information associated with whether a coordinated multi-point (CoMP) operation is performed for a UE connected to the first BS from a second BS connected to the first BS, when the received message includes information regarding start of the CoMP operation, performing the CoMP operation at a timing indicated based on at least part of the at least one piece of information included in the received message, increasing a modulation and coding scheme (MCS) level during a first period, and maintaining the CoMP operation performed during a second period after the MCS level reaches a first level based on the increase during the first period, and based on the received message including information regarding termination of the CoMP operation, terminating the CoMP operation at a timing based on at least part of the at least one piece of information included in the received message, and decreasing the MCS level during a third period.

2. The method of claim 1, comprising increasing the MCS level by 1 or more, when the number of hybrid automatic repeat request (HARQ) acknowledgment (ACK) receptions reaches a threshold, and/or decreasing the MCS level by 1 or more, when the number of HARQ negative ACK (NACK) receptions reaches a threshold.

3. The method of claim 1, wherein the second period is determined based on a minimum and/or low value between a service time based on a data volume per average throughput of the UE and a period of a measurement report.

4. The method of claim 1, wherein at least one of the first period, the second period, or the third period is settable by a service operator.

5. The method of claim 1, wherein the first BS and the second BS are connected to each other via at least a backhaul, and the received message includes information indicating whether the CoMP operation is performed on a slot basis for a system frame number (SFN), and includes at least one of: a position of a physical resource block (PRB) in which the CoMP operation is performed, the number of nulling layers, or information related to a signal-to-interference and noise ratio (SINR) increment according to the start of the CoMP operation.

6. The method of claim 1, further comprising transmitting an ACK to the second BS in response to the received message.

7. The method of claim 1, comprising: identifying an SINR increment based on the start of the CoMP operation, based on the at least part of the at least one piece of information included in the received message, and increasing the MCS level by at least 1 based on the SINR increment, and/or identifying an SINR decrement based on termination of the CoMP operation based on the at least part of the at least one piece of information included in the received message, and decreasing the MCS level by at least 1 based on the SINR decrement.

8. The method of claim 1, wherein the increase of the MCS level during the first period is adjusted by adjusting at least one parameter related to a number of HARQ ACK/NACK receptions from the UE.

9. The method of claim 1, wherein after the MCS level converges to the first level, the MCS level is maintained to be the first level during the second period.

10. The method of claim 1, wherein the first level is determined based on at least one of: an SINR increment based on the start of the CoMP operation, a maximum and/or high MCS level value reached in a previous CoMP operation, or a channel quality indication (CQI) value in a channel state information (CSI) report of the UE.

11. A first base station (BS) for performing wireless communication with a user equipment (UE), the first BS comprising:

a transceiver; and at least one processor comprising processor circuitry, wherein the at least one processor is configured, individually and/or collectively, to:

receive a message including at least one piece of information associated with whether a coordinated multipoint (CoMP) operation is performed for a UE to be connected to the first BS from a second BS to be connected to the first BS through the transceiver, based on the received message including information indicating start of the CoMP operation, control to perform the CoMP operation at a timing indicated based on at least part of the at least one piece of information to be included in the received message, increase a modulation and/or coding scheme (MCS) level during a first period, and maintain the CoMP operation performed during a second period after the MCS level reaches a first level based on the increase during the first period, and based on the received message including information indicating termination of the CoMP operation, control to terminate the CoMP operation at a timing based on at least part of the at least one piece of information to be included in the received message, and decrease the MCS level during a third period.

12. The first BS of claim 11, wherein the at least one processor is configured, individually and/or collectively, to increase the MCS level by at least 1, based on the number of hybrid automatic repeat request (HARQ) acknowledgment (ACK) receptions reaching a threshold, and/or control to decrease the MCS level by at least 1 based on the number of HARQ negative ACK (NACK) receptions reaching a threshold.

13. The first BS of claim 11, wherein the second period is to be determined based on a minimum and/or low value between a service time based on a data volume per average throughput of the UE and a period of a measurement report.

14. The first BS of claim 11, wherein at least one of the first period, the second period, or the third period is settable to any duration by a service operator.

15. The first BS of claim 11, wherein the first BS is configured to be connected to the second BS via at least a backhaul, and the received message is to include information indicating whether the CoMP operation is performed on a slot basis for a system frame number (SFN), and is to include at least one of: a position of a physical resource block (PRB) in which the CoMP operation is performed, the number of nulling layers, or information related to a signal-to-interference and noise ratio (SINR) increment according to the start of the CoMP operation.

16. The first BS of claim 11, wherein the at least one processor is further configured, individually and/or collectively, to control to transmit an ACK to the second BS in response to the received message via the transceiver.

17. The first BS of claim 11, wherein the at least one processor is configured to, individually and/or collectively:

identify an SINR increment according to the start of the CoMP operation based on the at least part of the at least one piece of information to be included in the received message, and increase the MCS level by at least 1 based on the SINR increment, and/or identify an SINR decrement based on the termination of the CoMP operation based on the at least part of the at least one piece of information to be included in the received message, and decrease the MCS level by at least 1 based on the SINR decrement.

18. The first BS of claim 11, wherein the at least one processor is configured, individually and/or collectively, to adjust the increase by adjusting at least one parameter related to a number of HARQ ACK/NACK receptions from the UE.

19. The first BS of claim 11, wherein the at least one processor is configured, individually and/or collectively, so that after the MCS level converges to the first level, the MCS level is maintained to be the first level during the second period.

20. The first BS of claim 11, wherein the at least one processor is configured, individually and/or collectively, to:

determine the first level based on at least one of: an SINR increment based on the start of the CoMP operation, a maximum and/or high MCS level value reached in a previous CoMP operation, or a channel quality indication (CQI) value in a channel state information (CSI) report of the UE.

* * * * *